(12) United States Patent
Vartakavi et al.

(10) Patent No.: US 12,273,572 B2
(45) Date of Patent: Apr. 8, 2025

(54) SYSTEM AND METHOD TO IDENTIFY PROGRAMS AND COMMERCIALS IN VIDEO CONTENT VIA UNSUPERVISED STATIC CONTENT IDENTIFICATION

(71) Applicant: Gracenote, Inc., Emeryville, CA (US)

(72) Inventors: Aneesh Vartakavi, Emeryville, CA (US); Arthur Findelair, Emeryville, CA (US)

(73) Assignee: Gracenote, Inc., New York, NY (US)

( * ) Notice: Subject to any disclaimer, the term of this patent is extended or adjusted under 35 U.S.C. 154(b) by 24 days.

(21) Appl. No.: 18/193,962

(22) Filed: Mar. 31, 2023

(65) Prior Publication Data

US 2023/0328297 A1 Oct. 12, 2023

Related U.S. Application Data

(60) Provisional application No. 63/326,486, filed on Apr. 1, 2022.

(51) Int. Cl.
*H04N 21/234* (2011.01)
*H04N 21/81* (2011.01)
*H04N 21/845* (2011.01)

(52) U.S. Cl.
CPC ..... *H04N 21/23418* (2013.01); *H04N 21/812* (2013.01); *H04N 21/845* (2013.01)

(58) Field of Classification Search
CPC ................................................ H04N 21/23418
See application file for complete search history.

(56) References Cited

U.S. PATENT DOCUMENTS

| 2007/0242926 | A1* | 10/2007 | Huang | H04N 21/458 386/250 |
| 2015/0046953 | A1* | 2/2015 | Davidson | H04N 21/44008 725/74 |
| 2017/0193548 | A1* | 7/2017 | Pacella | G06Q 30/0251 |
| 2017/0236003 | A1* | 8/2017 | Ma | A61B 6/032 382/131 |
| 2019/0205433 | A1* | 7/2019 | Lo | G06F 18/211 |
| 2021/0319592 | A1* | 10/2021 | Tsai | G06T 17/205 |

* cited by examiner

*Primary Examiner* — Michael H Hong
(74) *Attorney, Agent, or Firm* — McDonnell Boehnen Hulbert & Berghoff LLP

(57) ABSTRACT

In one aspect, an example method includes (i) determining, by a computing system, a mean image of a set of frames of video content; (ii) extracting, by the computing system, a reference template of static content from the mean image; (iii) identifying, by the computing system, the extracted reference template of static content in a frame of the set of frames of the video content; (iv) labeling a segment within the video content as either a program segment or an advertisement segment based on the identifying of the extracted reference template of static content in the frame of the video content; and (v) generating data identifying the labeled segment.

20 Claims, 13 Drawing Sheets

[373, 204, 406, 228]

[256, 166, 309, 200]

SYSTEM AND METHOD TO IDENTIFY PROGRAMS AND COMMERCIALS IN VIDEO CONTENT VIA UNSUPERVISED STATIC CONTENT IDENTIFICATION

REFERENCE TO RELATED APPLICATION

This application claims priority to U.S. Provisional Patent Application No. 63/326,486, filed Apr. 1, 2022, the entirety of which is hereby incorporated by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) determining, by a computing system, a mean image of a set of frames of video content; (ii) extracting, by the computing system, a reference template of static content from the mean image; (iii) identifying, by the computing system, presence of the extracted reference template of static content in a frame of the set of frames of the video content; (iv) labeling, by the computing system, a segment within the video content as either a program segment or an advertisement segment based on the identified presence of the extracted reference template of static content in the frame of the video content; and (v) generating, by the computing system, data identifying the labeled segment.

In another aspect, an example non-transitory computer-readable medium is disclosed. The computer-readable medium has stored thereon program instructions that upon execution by a processor, cause performance of a set of acts including (i) determining a mean image of a set of frames of video content; (ii) extracting a reference template of static content from the mean image; (iii) identifying presence of the extracted reference template of static content in a frame of the set of frames of the video content; (iv) labeling a segment within the video content as either a program segment or an advertisement segment based on the identified presence of the extracted reference template of static content in the frame of the video content; and (v) generating data identifying the labeled segment.

In another aspect, an example computing system is disclosed. The computing system is configured for performing a set of acts including (i) determining a mean image of a set of frames of video content; (ii) extracting a reference template of static content from the mean image; (iii) identifying presence of the extracted reference template of static content in a frame of the set of frames of the video content; (iv) labeling a segment within the video content as either a program segment or an advertisement segment based on the identified presence of the extracted reference template of static content in the frame of the video content; and (v) generating data identifying the labeled segment.

DETAILED DESCRIPTION

I. Overview

Figure 1:
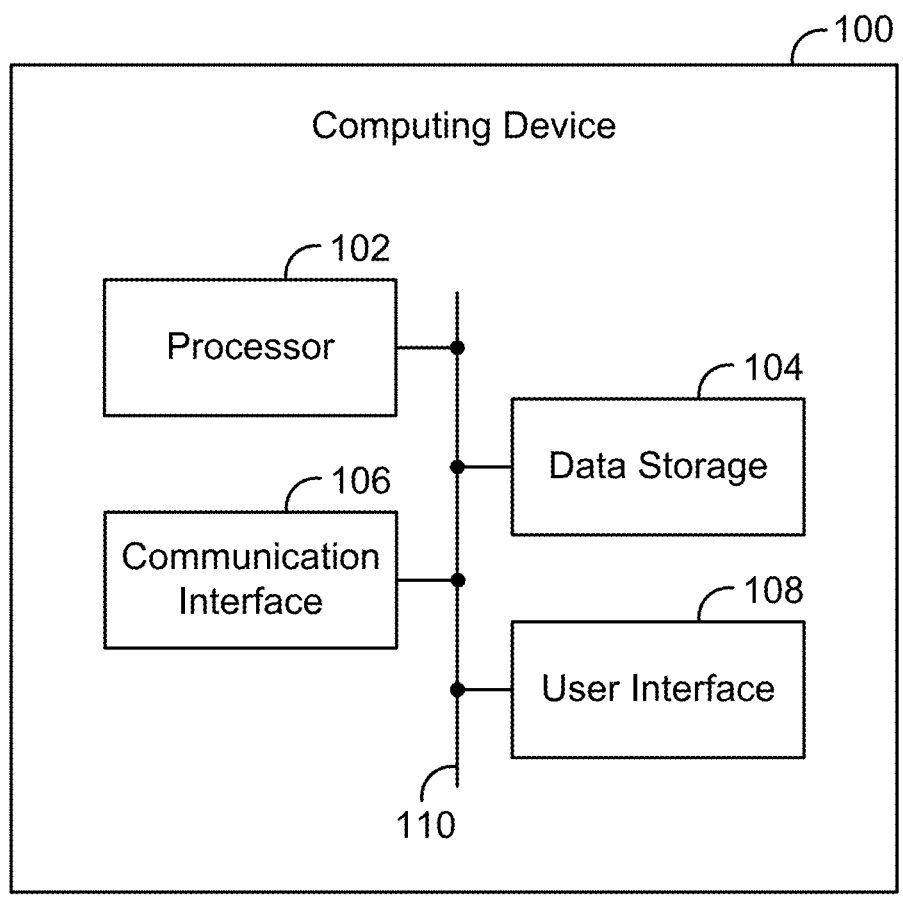
FIG. 1 is a simplified block diagram of an example computing device.

In the context of an advertisement system, it can be useful to know when and where advertisements are inserted. For instance, it may be useful to understand which channel(s) an advertisement airs on, the dates and times that the advertisement aired on that channel, etc. Further, it may also be beneficial to be able to obtain copies of advertisements that are included within a linear sequence of content segments. For instance, a user of the advertisement system may wish to review the copies to confirm that an advertisement was presented as intended (e.g., to confirm that an advertisement was presented in its entirety to the last frame). In addition, for purposes of implementing an audio and/or video fingerprinting system, it may be desirable to have accurate copies of advertisements that can be used to generate reference fingerprints, such as to facilitate dynamic ad insertion (e.g., by matching query fingerprint data with ad fingerprint data to find a replaceable advertisement in given video content) and/or other actions.

Still further, in some instances, when media content, such as a television show, is provided with advertisements that are inserted between program segments, it may be useful to obtain a copy of the television show from which the advertisements have been removed. This can allow a fingerprinting system to more granularly track and identify a location in time within the television show when a fingerprint of the television show is obtained from the television show during a scenario in which the television show is being presented without advertisements. The television show might not include advertisements, for instance, when the television show is presented via an on-demand streaming service at a later time than a time at which the television was initially broadcast or streamed.

As one might expect, the presence of a channel logo in a frame is a signal that indicates that the frame belongs to a program segment. Conventional techniques for logo identification (e.g. using a localized fingerprint) rely on accurate, high quality reference templates for a logo. A system using this at scale would need a team of editors to source the templates for each of the 8,000 channels in broadcast television in the United States alone. In addition, channels can change their logo over time, or use a "themed" logo for a special occasion (e.g. Halloween, Christmas, etc.). Channels often have multiple logos that they change dynamically even between a single program broadcast.

Channel logos belong to the general family of "static content", which could be defined to encompass any content overlaid on top of a broadcast, e.g. score ticker, "breaking news" banner, etc. These overlays are presented over content for varying amounts of time, but are usually not present over advertisement blocks.

This application describes an unsupervised approach to identifying static content in video content (e.g., a broadcast stream) without any pre-existing reference templates. In some examples, a computing system analyzes video content in two passes: the first pass extracts reference templates, and the second pass identifies the presence of the extracted reference templates in the video content.

The unsupervised approach can facilitate separating video content into program content and advertisement content and/or identifying transitions between program segments and advertisement segments. The unsupervised approach can also improve other techniques that benefit from identifying or removing static content such as fingerprinting (fingerprint the content while ignoring the channel-specific, static overlay), or keyframe/blackframe detection (apply keyframe/blackframe detection to the content while ignoring the channel-specific, static overlay).

In an example method, a computing system can determine a mean image of a set of frames of video content, and extract a reference template of static content from the mean image. The computing system can then detect presence of the extracted reference template of static content in a frame of the set of frames of the video content. Further, based on the identified presence of the extracted reference template of static content in the frame of the video content, the computing system can label a segment within the video content as either a program segment or an advertisement segment, and the computing system can generate data identifying the labeled segment.

Various other features of the example method discussed above, as well as other methods and systems, are described hereinafter with reference to the accompanying figures.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a processor 102, data storage 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include one or more general-purpose processors (e.g., a microprocessor) and/or one or more special-purpose processors (e.g., a digital signal processor (DSP)). The processor 102 can execute program instructions included in the data storage 104 as discussed below.

The data storage 104 can include one or more volatile, non-volatile, removable, and/or non-removable storage components, such as magnetic, optical, and/or flash storage, and/or can be integrated in whole or in part with the processor 102. Further, the data storage 104 can take the form of non-transitory data storage, such as one or more non-transitory computer-readable storage media, having stored thereon program instructions (e.g., compiled or non-compiled program logic and/or machine code) that, upon execution by the processor 102, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 106 and/or the user interface 108. The data storage 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface. In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

B. Computing System

Each of the systems, devices, or other entities described in this disclosure can be implemented as a computing system. In this disclosure, the term "computing system" means a system that includes at least one computing device. In some instances, a computing system can include one or more other computing systems.

III. Example Operations

A computing system, such as the computing device 100 and/or components thereof, can perform various acts and/or functions. Examples of these and related features will now be described.

A. Extracting a Reference Template of Static Content

In line with the discussion above, the computing system can establish a mean image and can extract a reference template of static content from the mean image.

A mean image is an average of a collection of frames over time. For instance, a mean image can include average grayscale values for respective pixel positions over a set of frames of video content. A set of frames of video content may be referred to as a window of the video content.

Figure 2:
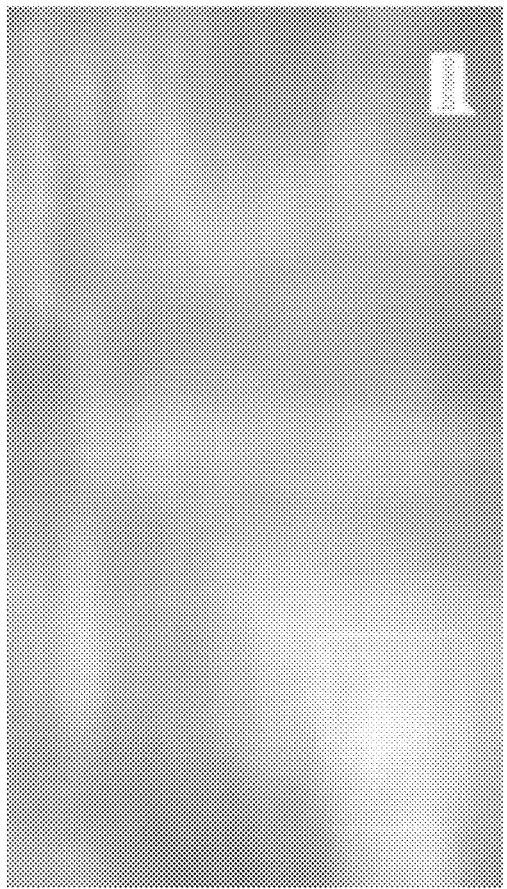
FIG. 2 shows two example mean images.
Figure 2:
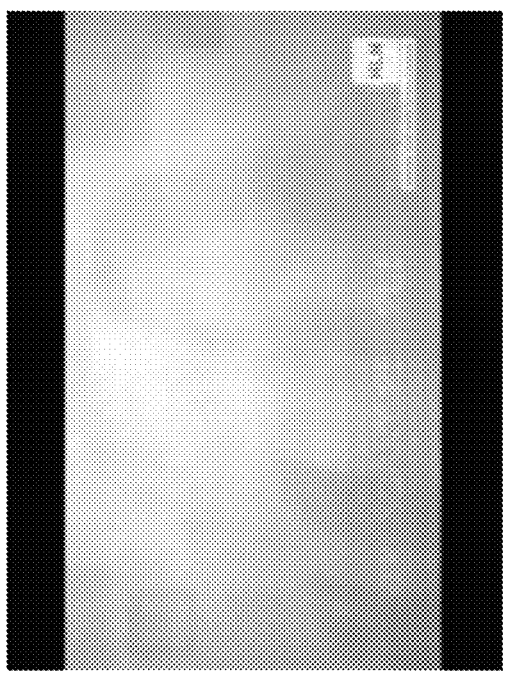

In a mean image, static content may be clearly visible because the static content is unchanging over a series of frames, while the other regions of content may be blurred out due to the changing background over the series of frames. FIG. 2 shows two example mean images that illustrate this. In particular, each example mean image in FIG. 2 includes clearly visible static content at its lower right corner, with the remainder of each image being generally blurred out.

The computing system can compute a mean image in black and white and at a reduced frame rate (e.g. 1 frame per second). Further, the computing system can compute the mean image over a threshold duration of video content, such as five minutes of the video content, fifteen minutes of the video content, thirty minutes of the video content, one hour of the video content, etc.

In some examples, the computing system computes the mean image between scene changes or keyframes, i.e., as an average of a window of frames between instances of scene changes or keyframes.

Video content can include a number of shots. A shot of video content includes consecutive frames that show a continuous progression of video and that are thus interrelated. In addition, video content can include solid color frames that are substantially black, referred to as blackframes. A video editor can insert blackframes between shots of a video, or even within shots of a video. Additionally or alternatively, blackframes can be inserted between program segments and advertisement segments, between different program segments, or between different advertisement segments.

For many frames of video content, there is minimal change from one frame to another. However, for other frames of video content, referred to as keyframes, there is a significant visual change from one frame to another. As an example, for video content that includes a program segment followed by an advertisement segment, a first frame of the advertisement segment may be significantly different from a last frame of the program segment such that the first frame is a keyframe. As another example, a frame of an advertisement segment or a program segment following a blackframe may be significantly different from the blackframe such that the frame is a keyframe. As yet another example, a segment can include a first shot followed by a second shot. A first frame of the second shot may be significantly different from a last frame of the first shot such that the first frame of the second shot is a keyframe.

Figure 3:
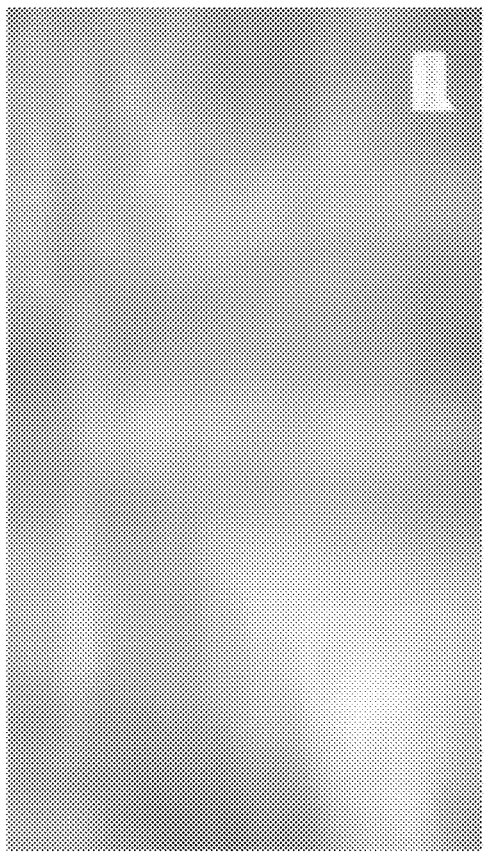
FIG. 3 shows the two example mean images of FIG. 2 after bilateral filtering is applied.
Figure 3:
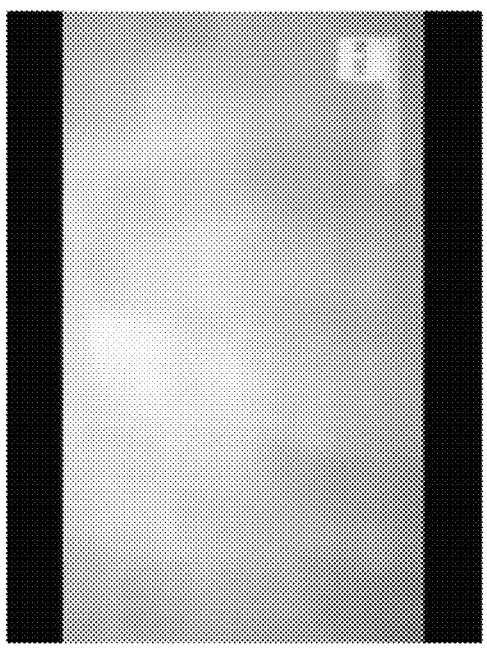
Figure 4:
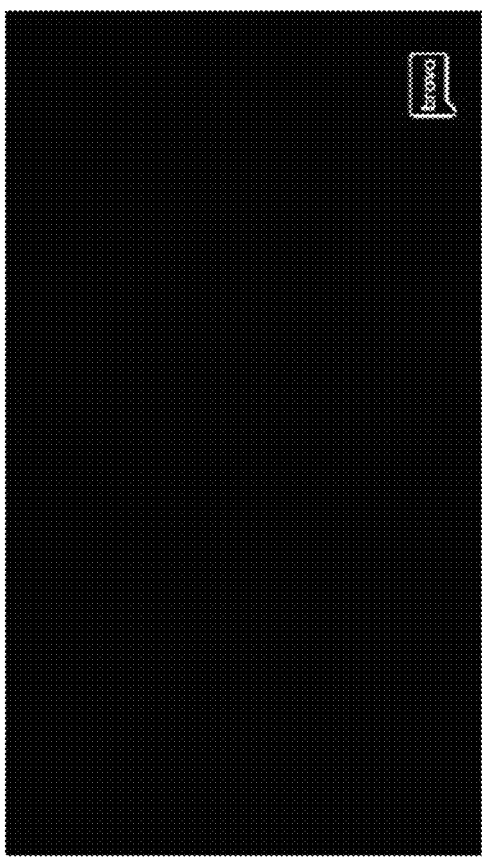
FIG. 4 shows binary images that are generated from the filtered mean images of FIG. 3.
Figure 4:
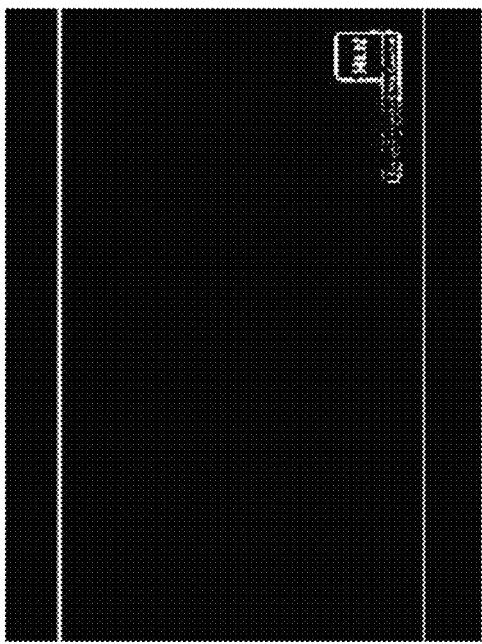

To facilitate extracting a reference template of static content from a mean image, the computing system can smooth out the background of the mean image while preserving strong edges, and the computing system can then generate a binary image from the smoothed image. For instance, the computing system can use bilateral filtering or bicubic interpolation to smooth the background of the mean image. FIG. 3 shows the two example mean images of FIG. 2 after bilateral filtering is applied. Further, the computing system can use adaptive thresholding to convert the filtered image to a binary image. The adaptive thresholding detects high-intensity variance regions using a threshold value that is a Gaussian-weighted sum of the neighborhood values minus a constant. FIG. 4 shows binary images that are generated from the filtered images of FIG. 3.

The computing system can also use other techniques for background subtraction removal, instead of the combination of smoothing and adaptive thresholding. For instance, the computing system could use neural network background subtraction.

Figure 5:
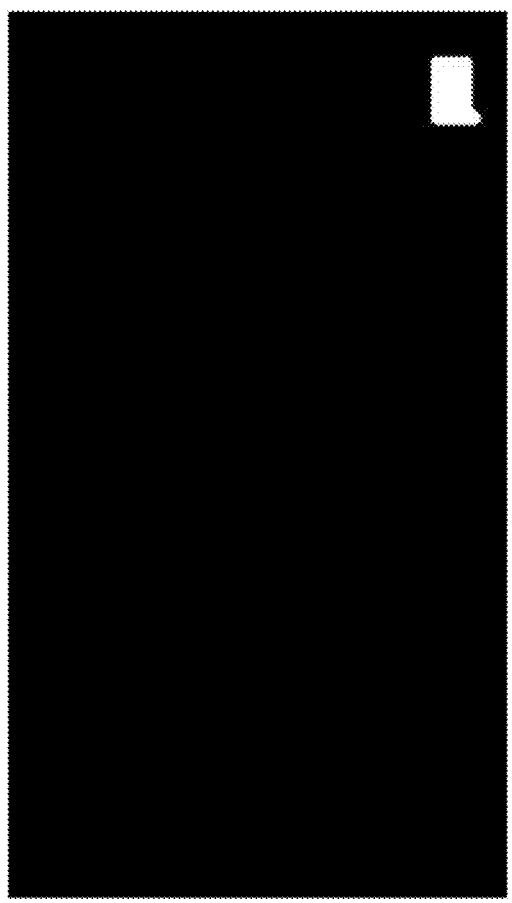
FIG. 5 shows processed images that are generated from the binary images of FIG. 4.
Figure 5:
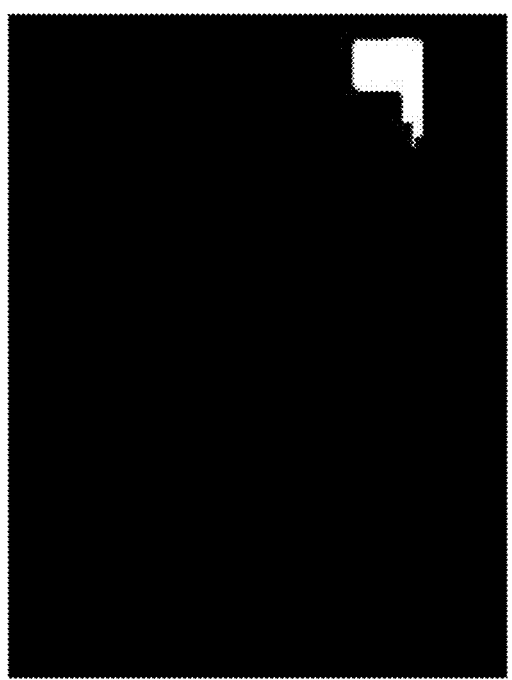

In some examples, the computing system uses the entire binary image as the reference template of static content. In other examples, the computing system extracts templates from sub-regions of the binary image. By way of example, the computing system can apply a set of morphological operations to the binary image. In some instances, the set of morphological operations includes erosion and dilation. Erosion can erode away the boundaries of foreground objects. Dilation increases the white region in an image. The combination of erosion followed by dilation is referred to as opening and can remove noise from the binary image. Opening can also be used to remove long vertical and horizontal lines when applied with horizontal and vertical linear kernels. The combination of dilation followed by erosion is referred to as closing and can fill in small holes in foreground objects so as to form blobs. After forming blobs, the computing system can classify each blob by size (e.g., based on area or perimeter), and remove small blobs having a size that falls below a threshold percentile (e.g., 65%, 80% etc.) FIG. 5 shows processed images that may be generated in this manner from the binary images of FIG. 4.

Figure 6:
FIG. 6 shows bounding boxes determined using the processed images of FIG. 5.
Figure 6:
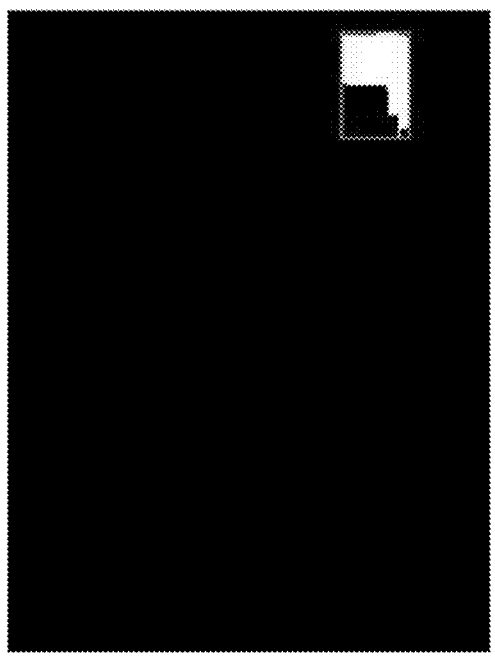

After processing the binary images, the computing system can determine bounding boxes of the residual components. The bounding boxes indicate the locations of the static content. In some instances, the computing system analyzes the width, height, and aspect ratio of each bounding box to determine whether the computing system uses the bounding box for reference template extraction. For instance, the computing system can use bounding boxes having a threshold width (e.g., 1%, 2%, or 5% of the width of the image), a threshold height (e.g. 1%, 2%, or 5% of the height of the image), and an aspect ratio that falls within a desired range (e.g., between 0.05 and 20, or between 0.01 and 10). FIG. 6 shows bounding boxes determined using the processed images of FIG. 5.

Figure 7:
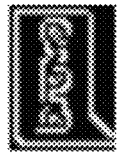
FIG. 7 shows reference templates extracted using edges detected within sub-regions of the binary images of FIG. 4.
Figure 7:
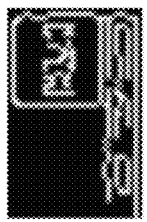

The computing system can then extract reference templates from sub-regions of the binary image identified by the bounding boxes. As one example, the computing system can use an edge detection algorithm (e.g. a Canny edge detector) to identify edges within a sub-region of the binary image, and use the edges as a reference template. FIG. 7 shows reference templates extracted using edges detected within sub-regions of the binary images of FIG. 4. The four coordinates for each reference template identify the top, left corner of the reference template and the bottom, right corner of the reference template within the binary images of FIG. 4. As another example, the computing system can compute gradients of the sub-region of the binary image using a Sobel filter, and use the gradients as a reference template. As still another example, the computing system can determine a fingerprint from sub-regions of the binary image identified by the bounding boxes.

In some examples, the computing system can extract multiple different reference templates for each sub-region (e.g., extract a first reference template by detecting edges and extract a second reference template by computing a gradient). This can improve the matching performance of the computing system.

B. Refining Extracted Reference Templates

In some examples, the computing system extracts multiple candidate reference templates respectively from each of various sets of frames of video content over time. The computing system can then refine the candidate reference templates by selecting one or more of the candidate reference templates for use in matching with source images.

The computing system can refine a set of candidate reference templates in various ways. As one example, the computing system can refine a set of candidate reference templates for a current set of frames by determining whether any reference templates for that set of frames align (e.g., occur at the same or similar bounding box location) with any reference templates for a previous set of frames. If the computing system determines that any reference templates for the current set of frames align with any reference templates for a previous set of frames, then the computing system can retain only the candidate reference templates that align for both the current set of frames and the previous set of frames. Otherwise, the computing system can retain all candidate reference templates for the current set of frames and the previous set of frames as reference templates for the current set of frames. As such, the refinement can filter out some of the candidate reference templates and can also offer reference template(s) for the current set of frames in a scenario where the computing system did not detect any reference templates for the current set of frames.

Figure 8:
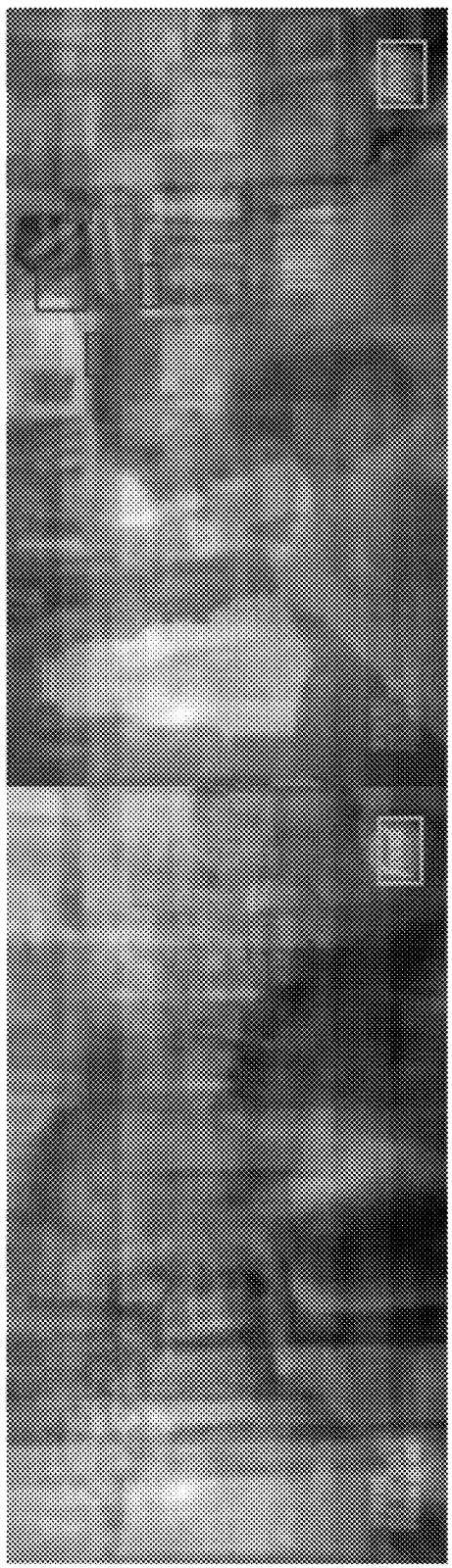
FIG. 8 shows candidate reference templates for a current set of frames and a previous set of frames.

FIG. 8 illustrates an example of this process. In particular, FIG. 8 shows example candidate reference templates for a current set of frames (right side) and a previous set of frames (left side), with a candidate reference template in a bottom, right corner for the previous set of frames being aligned with a candidate reference template in a bottom, right corner for the current set of frames. Because this candidate reference template for the current set of frames aligns with the candidate reference template for the previous set of frames, the computing system may retain that candidate reference template as a reference template for the current set of frames. In this scenario, on the other hand, if there were other candidate reference templates for the current set of frames that did not align with any reference templates for the previous set of frames, then the computing system may discard those other candidate reference templates.

Figure 9:
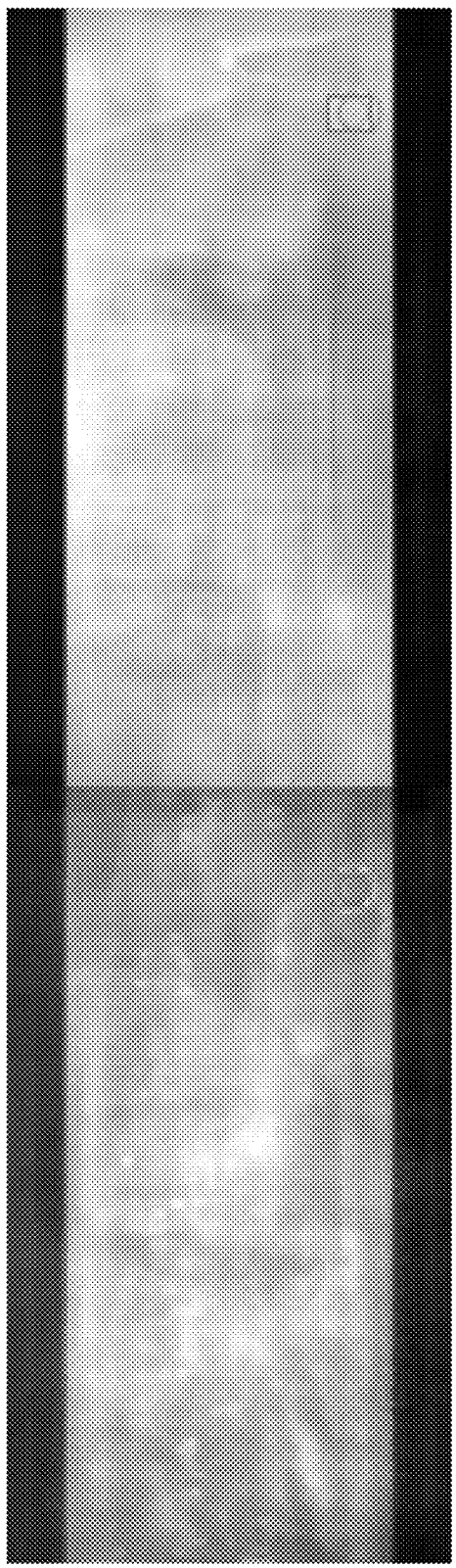
FIG. 9 shows a candidate reference template for a previous set of frames.

FIG. 9 illustrates another example of this process. In particular, FIG. 9 shows a candidate reference template for a previous set of frames (left side) and shows that current set of frames (right side) does not have any candidate reference templates. In this scenario, the computing system selects the candidate reference template for the previous set of frames as a reference template for the current set of frames, because the computing system did not detect any candidate reference templates for the current set of frames.

C. Matching Reference Templates with Source Images

After extracting one or more reference templates for a set of frames, the computing system can match the extracted reference templates against individual source images of the set of frames. As one example, for a source image of the video content, the computing system can generate a binary image from the source image, and match a reference template against the binary image. In examples in which the reference template is extracted from a sub-region, the computing system matches the reference template against a corresponding sub-region of the binary image generated from the source image.

Figure 10:
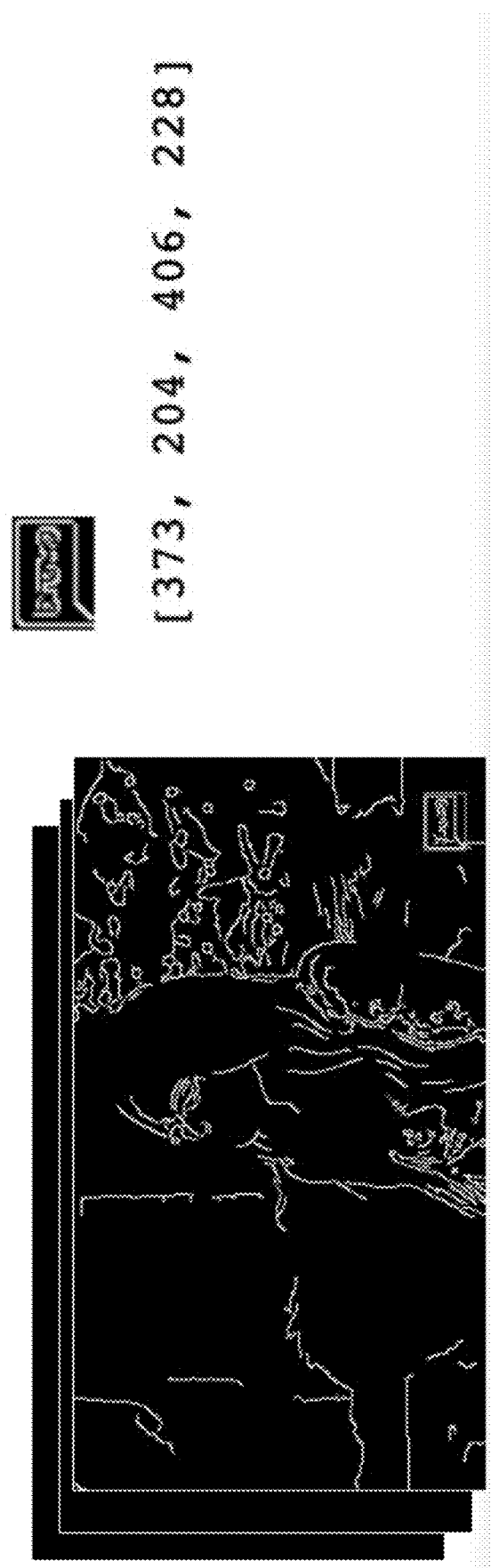
FIG. 10 shows a sub-region of a binary image generated from a source image that is matched against a reference template.

For instance, the matching can involve determining a dot product between the reference template (e.g., edges detected) and edges detected within the corresponding sub-region of the binary image, and assigning a match score based on the fraction of edges matched. FIG. 10 shows a sub-region of a binary image generated from a source image that is matched against a reference template.

In some examples, the computing system extracts reference templates at multiple different positions within a frame and/or extracts multiple reference templates for a sub-region using different techniques (e.g., edge detection, gradients, fingerprints, etc.). When matching the reference templates to a source frame, the computing system can determine individual match scores for each respective reference template, and then determine whether the source image has static content or not based on the individual match scores. For instance, the computing system can threshold a mean or maximum of the individual match scores to determine whether the source image has static content.

D. Labeling Frames

By matching reference templates with source images, the computing system can determine match scores for respective frames of the video content. Further, the computing system can threshold the match scores to classify and thus label individual frames as being either program content or advertisement content.

For instance, as to a given frame, if the computing system determines a sufficiently high match score for at least one established reference template (e.g. that at least that established reference template matches content of the frame with certainty that is at least as high as a predefined threshold level of certainty), then the computing system may deem that frame to be program content rather than advertisement content and may thus classify and label the frame accordingly. Whereas, if the computing system does not determine for the given frame a sufficiently high match score for any established reference template (e.g., that no reference template matches content of the frame with certainty that is at least as high as the predefined threshold level of certainty), then the computing system may deem that frame to be advertisement content rather than program content and may thus classify and label the frame accordingly.

Further, in a scenario where there are multiple reference templates having multiple individual match scores for a frame, the computing system may base the labeling of the frame on whether at least a predefined threshold quantity of those match scores satisfy a match score threshold. Based on determining that a threshold number (e.g., 50%, or 75%) of the individual match scores satisfy a match score threshold, for instance, the computing system may label the frame as program content rather than advertisement content. Whereas, based on determining that a threshold number of the individual match scores do not satisfy a match score threshold, the computing system may label the frame as advertisement content rather than program content.

The match score threshold can be determined in various ways depending on the desired implementation. As one example, the computing system can fit the histogram of matching scores for a set of frames with a bimodal Gaussian mixture model, and determine a local minimum between the two normal distributions as the match score threshold. As another example, the computing system can use Otsu's thresholding to determine a match score threshold that minimizes the intra-class variance of thresholded categories (high precision, low recall). In some instances, the computing system selects an average of the local minimum and the Otsu's threshold as the match score threshold.

E. Labeling Segments

After the computing system analyzes multiple sets of frames (e.g., windows) of the video content, the computing system can store a list of all the indices of frames that are labeled as program content. Further, the computing system can then generate labeled segments (e.g., program segments and/or advertisement segments) using the indices of frames that are labeled as program content. As an example, the computing system can group sequences of indices into program segments. In some instances, the computing system drops small program segments, such as program segments that correspond to less than five seconds of video content. In addition, the computing system can merge continuous program segments having gaps that are less than one-minute (e.g., a first program segment and a second program segment that are separated by twenty-five seconds). The computing system can label any segments that are not program segments as advertisement segments.

F. Identifying and Aligning Transitions

The computing system can identify transitions between advertisement segments and program segments using the labeled segments. For instance, the computing system can identify the first frame of a program segment that follows an advertisement segment as a transition from an advertisement segment to a program segment. As another example, the computing system can identify the first frame of an advertisement segment that follows a program segment as a transition from a program segment to an advertisement segment.

Figure 11:
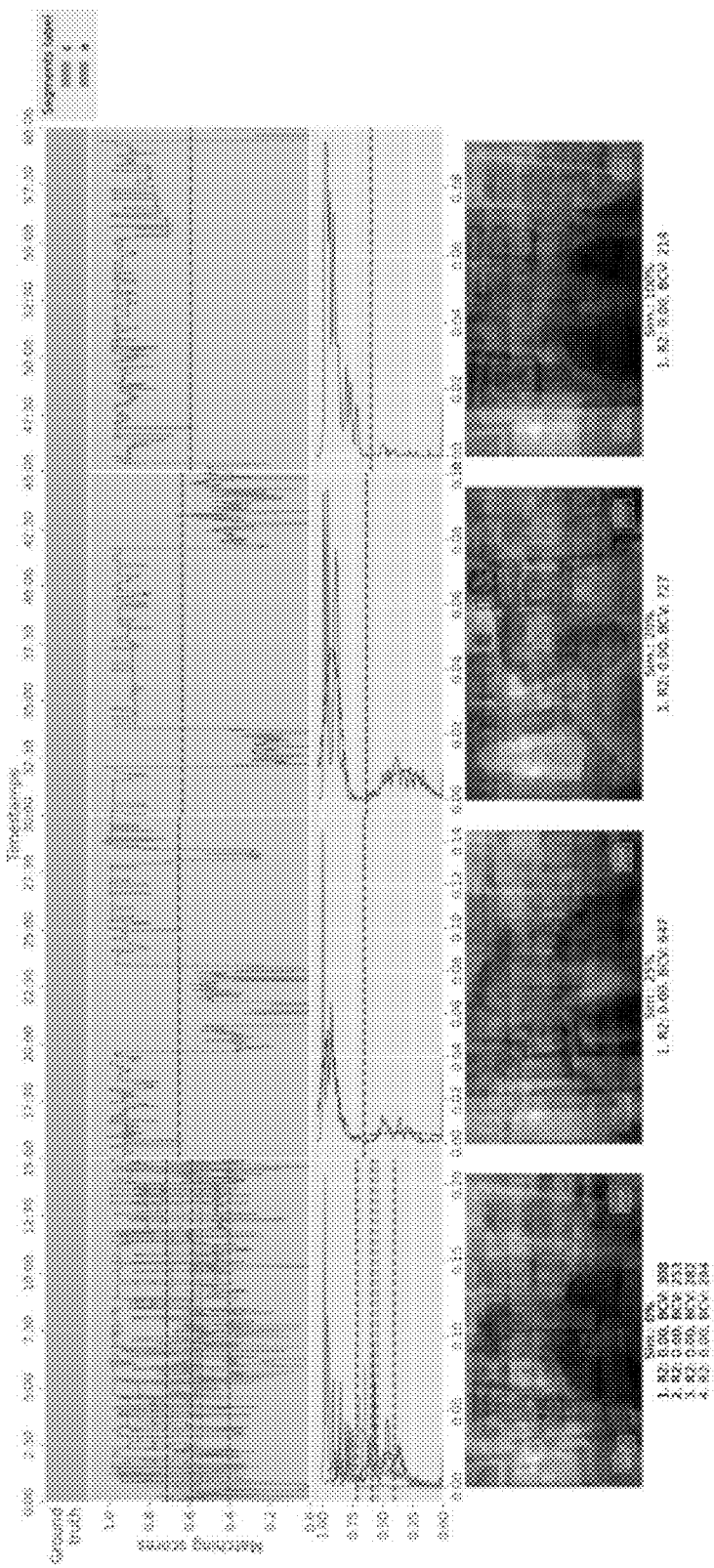
FIG. 11 shows example match scores, reference templates, and labeled segments for four sets of frames of video content.

In some examples, the computing system can increase the accuracy of identified transitions by aligning the identified transitions to a closest keyframe and/or blackframe. This can help to address the issue of channel logos or other static content that fades in or out during transitions between advertisement content and program content. The computing system can receive a list of keyframes from a keyframe detector, and receive a list of blackframes from a blackframe detector. FIG. 11 shows example match scores, reference templates, and labeled segments for four sets of frames of video content.

G. Improving Fingerprint Generators, Keyframe Detectors, and Blackframe Detectors The computing system can also use the locations of identified static content to improve fingerprint generators, keyframe detectors, and/or blackframe detectors. For example, some fingerprint generators, keyframe detectors, and/or blackframe detectors operate by analyzing content of an entire frame. As a result, the presence of static overlays (e.g. logos, news tickers, etc.) can negatively impact the accuracy of the analysis. To address this issue, the bounding boxes mentioned above can be used to filter out a portion(s) of a frame, such that a fingerprint generator, keyframe detector, or blackframe detector does not consider the portion of the frame when analyzing the frame.

H. Example Algorithm

Figure 12:
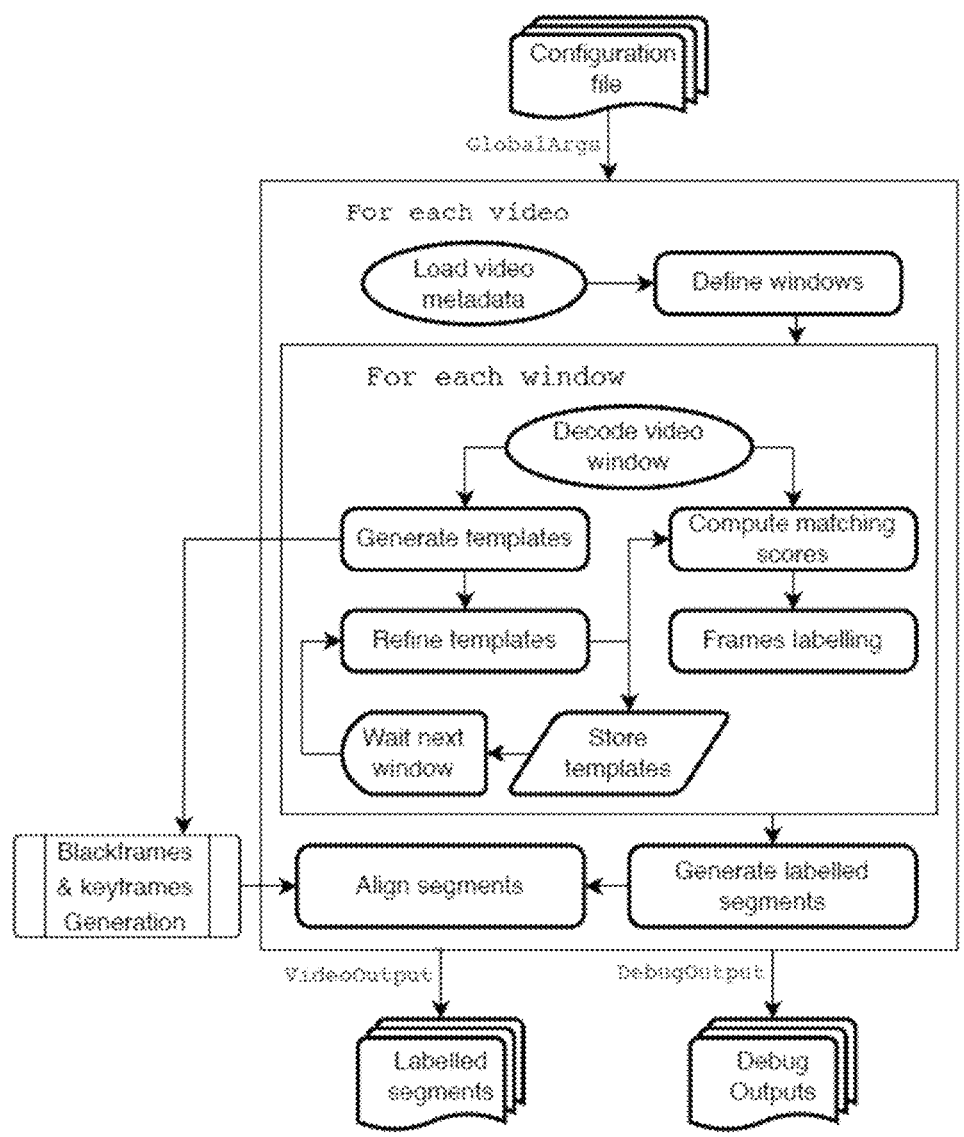
FIG. 12 shows an example algorithm for labeling segments of video content as program segments or advertisement segments.

FIG. 12 shows an example algorithm for labeling segments of video content as program segments or advertisement segments.

As shown in FIG. 12, and as discussed above, a computing system could evaluate windows of video frames, each defining a series of video frames. Namely, for each window, the computing system could generate a set of reference templates of static content and could refine and store the set of reference templates. Further, for each window, the computing system could match the reference templates against individual frames of the window to establish matching scores for the various frames of the window, and, based on the matching scores, the computing system could label each of various frames of the window respectively as being either program content or advertising content.

The computing system can then generate labeled segments of frames, such as by grouping as a program segment a series of frames each labeled as program content and grouping as an advertising segment a series of frames each labeled as advertising content, with some exception. The computing system can then identify transitions between advertising content and program content based on the segment labels and possibly also considering where blackframes and keyframes occur. Further, the computing system may use the in-frame locations of identified static content as a basis to improve fingerprinting and frame detection, such as by filtering out the static content.

Figure 13:
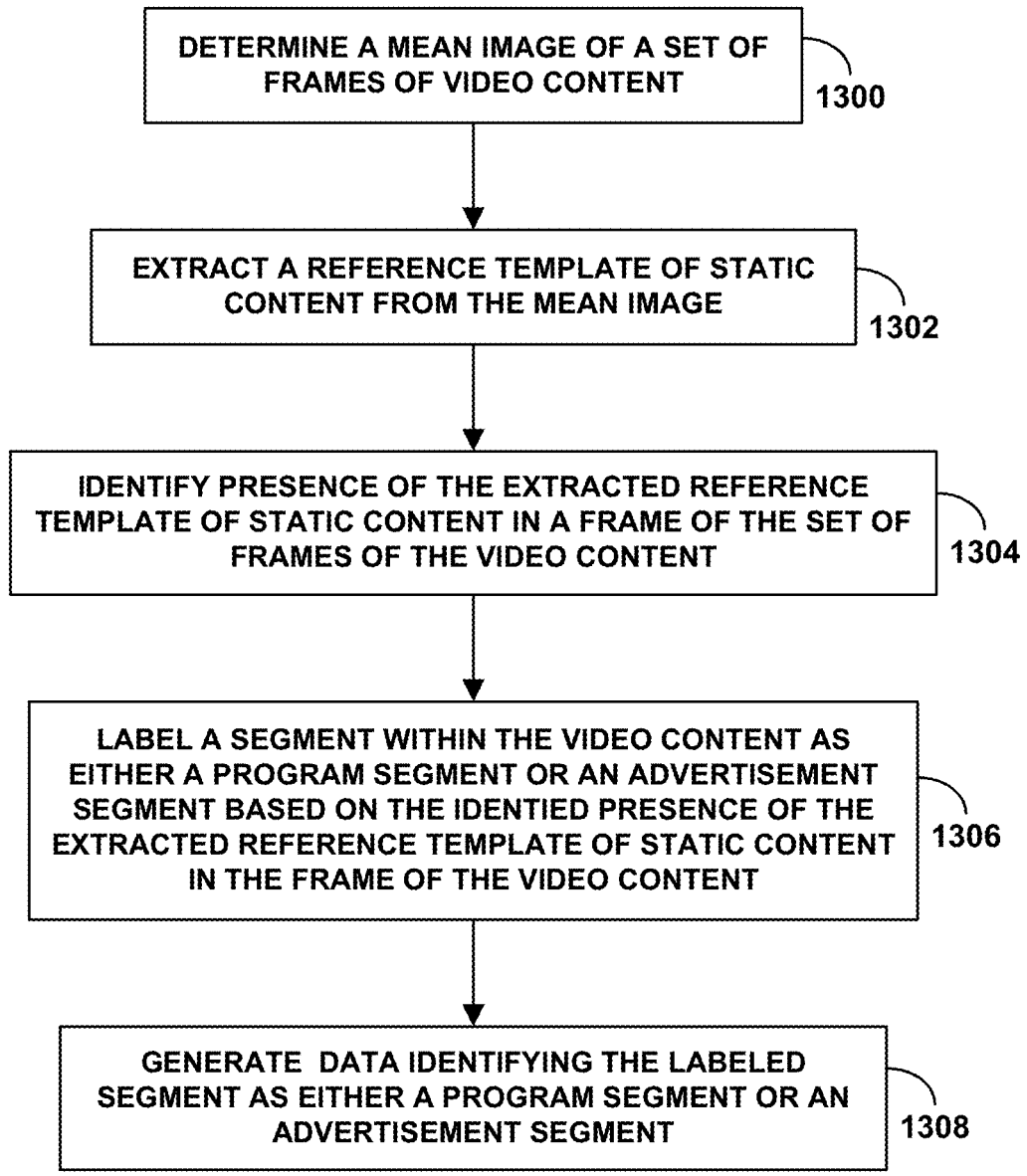
FIG. 13 is a flow chart illustrating an example method.

FIG. 13 is a flow chart illustrating an example method that a computing system could thus carry out. As shown in FIG. 13, at block 1300, the method includes the computing system determining a mean image of a set of frames of video content. At block 1302, the then includes the computing system extracting a reference template of static content from the mean image. At block 1304, the method then includes the computing system identifying the extracted reference template of static content in a frame of the set of frames of the video content. At block 1306, the method then includes the computing system labeling a segment within the video content as either a program segment or an advertisement segment based on the identifying of the extracted reference template of static content in the frame of the video content. And at block 1308, the method includes the computing system generate data identifying the labeled segment.

In line with the discussion above, the act of extracting the reference template of static content from the mean image could involve generating a binary image from the mean image and using the binary image as the reference template of static content. Further, the act of extracting the reference template of static content from the mean image could involve (i) generating a binary image from the mean image, (ii) applying one or more morphological operations to the binary image so as to identify a residual component of the binary image, and (iii) extracting a reference template of static content based on the residual component. And as discussed above, the act of extracting the reference template of static content based on the residual component could involve determining a bounding box of the residual component and extracting a reference template of static content from a sub-region of the binary image corresponding to the bounding box.

As further discussed above, the act of identifying the extracted reference template of static content in a frame of the video content could involve matching the extracted reference template of static content against the frame of the video content so as to determine a match score and identifying the extracted reference template of static content based on the match score.

In addition, as discussed above, the method could further include labeling the frame of the video content as program content rather than advertisement content based on the identifying of the extracted reference template of static content in the frame of the video content.

Further, the reference template of static content could be a first reference template of static content, and the method could additionally include the computing system extracting a second reference template of static content from the mean image and identifying by the computing system the extracted second reference template of static content in the frame, in which case the act of labeling of the frame of video content as program content rather than advertisement content could be based on both the identifying of the extracted first reference template of static content in the frame and the identifying of the extracted second reference template of static content in the frame.

Still further, as discussed above, the process of identifying the labeled segment as a program segment or an advertisement segment could usefully facilitate numerous actions. By way of example, the labeling could facilitate removing of identified advertisement segments from video content to facilitate later presentation of the video content without advertisements. Further, the labeling could facilitate dynamic ad insertion, such as by facilitating generating of reference fingerprint data advertisement segments so as to allow later detection of replaceable advertisements in video content.

The data that the computing system generates that identifies a labeled segment could designate the given segment as either a program segment or an advertisement, to facilitate these or other useful actions. For instance, the computing system could record in a database or other data file a correlation between the segment (e.g., based on its frame timestamps) and the established label as being either program content or advertisement content. Alternatively or additionally, the computing system could add metadata, watermarking, or the like to the video content and/or to a transport stream carrying the video content, on a per frame basis or the like, to designate the established segment label, likewise to facilitate useful associated action.

As noted above, this method could be carried out by a computing system such as that described above. Further, the present disclosure also contemplates at least one non-transitory computer readable medium (e.g., magnetic, optical, flash, RAM, ROM, EPROM, EEPROM, etc.) that is encoded with, embodies, or otherwise stores program instructions executable by at least one processor to carry out the operations of the method and/or other operations discussed herein.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
   determining, by a computing system, a mean image of a set of frames of video content;
   extracting, by a computing system, a reference template of static content from the mean image;
   identifying, by the computing system, presence of the extracted reference template of static content in a frame of the set of frames of the video content;
   labeling, by the computing system, a segment within the video content as either a program segment or an advertisement segment based on the identified presence of the extracted reference template of static content in the frame of the video content; and
   generating, by the computing system, data identifying the labeled segment.

2. The method of claim 1, wherein extracting the reference template of static content from the mean image comprises:
   generating a binary image from the mean image; and
   using the binary image as the reference template of static content.

3. The method of claim 1, wherein extracting the reference template of static content from the mean image comprises:
   generating a binary image from the mean image;
   applying one or more morphological operations to the binary image so as to identify a residual component of the binary image; and
   extracting a reference template of static content based on the residual component.

4. The method of claim 1, wherein identifying presence of the extracted reference template of static content in a frame of the video content comprises:
   matching the extracted reference template of static content against the frame of the video content so as to determine a match score; and
   identifying presence of the extracted reference template of static content based on the match score.

5. The method of claim 1, further comprising labeling the frame of the video content as program content rather than advertisement content based on the identified presence of the extracted reference template of static content in the frame of the video content.

6. The method of claim 1, wherein output data identifying the labeled segment is useable to facilitate taking an action, wherein the action comprises dynamic ad insertion.

7. The method of claim 3, wherein extracting the reference template of static content based on the residual component comprises:
   determining a bounding box of the residual component; and
   extracting a reference template of static content from a sub-region of the binary image corresponding to the bounding box.

8. The method of claim 5, wherein the reference template of static content is a first reference template of static content, the method further comprising extracting by the computing system a second reference template of static content from the mean image and identifying by the computing system presence of the extracted second reference template of static content in the frame,
  wherein the labeling of the frame of video content as program content rather than advertisement content is based on both the identified presence of the extracted first reference template of static content in the frame and the identified presence of the extracted second reference template of static content in the frame.

9. A computing system comprising:
one or more processors;
non-transitory data storage; and
program instructions stored in the non-transitory data storage and executable by the one or more processors to carry out operations including:
  determining a mean image of a set of frames of video content,
  extracting a reference template of static content from the mean image,
  identifying presence of the extracted reference template of static content in a frame of the set of frames of the video content,
  labeling a segment within the video content as either a program segment or an advertisement segment based on the identified presence of the extracted reference template of static content in the frame of the video content, and
  generating data identifying the labeled segment.

10. The computing system of claim 9, wherein extracting the reference template of static content from the mean image comprises:
  generating a binary image from the mean image; and
  using the binary image as the reference template of static content.

11. The computing system of claim 9, wherein extracting the reference template of static content from the mean image comprises:
  generating a binary image from the mean image;
  applying one or more morphological operations to the binary image so as to identify a residual component of the binary image; and
  extracting a reference template of static content based on the residual component.

12. The computing system of claim 9, wherein identifying presence of the extracted reference template of static content in a frame of the video content comprises:
  matching the extracted reference template of static content against the frame of the video content so as to determine a match score; and
  identifying presence of the extracted reference template of static content based on the match score.

13. The computing system of claim 9, wherein the operations further include labeling the frame of the video content as program content rather than advertisement content based on the identified presence of the extracted reference template of static content in the frame of the video content.

14. The computing system of claim 9, wherein output data identifying the labeled segment is useable to facilitate taking an action, wherein the action comprises dynamic ad insertion.

15. The computing system of claim 11, wherein extracting the reference template of static content based on the residual component comprises:
  determining a bounding box of the residual component; and
  extracting a reference template of static content from a sub-region of the binary image corresponding to the bounding box.

16. The computing system of claim 13, wherein the reference template of static content is a first reference template of static content, the method further comprising extracting by the computing system a second reference template of static content from the mean image and identifying by the computing system presence of the extracted second reference template of static content in the frame,
  wherein the labeling of the frame of video content as program content rather than advertisement content is based on both the identified presence of the extracted first reference template of static content in the frame and the identified presence of the extracted second reference template of static content in the frame.

17. A non-transitory computer-readable medium having stored thereon program instructions that, upon execution by a processor, cause performance of a set of operations comprising:
  determining a mean image of a set of frames of video content;
  extracting a reference template of static content from the mean image;
  identifying presence of the extracted reference template of static content in a frame of the set of frames of the video content;
  labeling a segment within the video content as either a program segment or an advertisement segment based on the identified presence of the extracted reference template of static content in the frame of the video content; and
  generating data identifying the labeled segment.

18. The non-transitory computer-readable medium of claim 17, wherein extracting the reference template of static content from the mean image comprises:
  generating a binary image from the mean image; and
  applying one or more morphological operations to the binary image so as to identify a residual component of the binary image; and
  extracting a reference template of static content based on the residual component.

19. The non-transitory computer-readable medium of claim 17, wherein identifying presence of the extracted reference template of static content in a frame of the video content comprises:
  matching the extracted reference template of static content against the frame of the video content so as to determine a match score; and
  identifying presence of the extracted reference template of static content based on the match score.

20. The non-transitory computer-readable medium of claim 17, wherein the operations further comprise labeling the frame of the video content as program content rather than advertisement content based on the identifying of the extracted reference template of static content in the frame of the video content.

* * * * *